United States Patent [19]

Boelter

[11] 4,222,698
[45] Sep. 16, 1980

[54] TRAILER ASSEMBLY FOR SNOWMOBILES

[75] Inventor: Stuart R. Boelter, Thief River Falls, Minn.

[73] Assignee: Arctic Enterprises, Inc., Thief River Falls, Minn.

[21] Appl. No.: 897,763

[22] Filed: Apr. 17, 1978

[51] Int. Cl.² .............................. B60P 1/32; B60P 3/06
[52] U.S. Cl. .................................. 414/477; 414/482; 414/484; 414/485; 414/537
[58] Field of Search ............... 414/480, 469, 482, 483, 414/484, 485, 477, 478, 479, 437

[56] References Cited

U.S. PATENT DOCUMENTS

| 2,316,702 | 4/1943 | McDaniel | 414/483 X |
| 2,607,502 | 8/1952 | Willitts | 414/483 |
| 2,919,825 | 1/1960 | Hornsby | 414/483 X |
| 4,109,809 | 8/1978 | Clark | 414/480 |
| 4,133,440 | 5/1978 | Heidrick, Jr. | 414/483 |

*Primary Examiner*—Robert G. Sheridan

*Attorney, Agent, or Firm*—Allegretti, Newitt, Witcoff & McAndrews

[57] ABSTRACT

A trailer assembly for transporting snowmobiles. The trailer assembly includes a movable frame, preferably supported on wheels, a first snowmobile support portion mounted on the frame, and a second snowmobile support portion mounted on the frame in cooperative relationship with the first support portion. A mechanism is provided for adjusting the relative angular position between the first and second support portions, the adjusting mechanism being adapted to move the support portions between a first position and a second position. The support portions are at a relative angular position on the frame, with the first support portion being inclined downwardly towards the ground for facilitating loading and unloading of the snowmobile onto and from the trailer assembly, when the support portions are in the first position, and being in substantial alignment for supporting a snowmobile in a substantially horizontal position while the snowmobile is being transported, when the support portions are in the second position.

7 Claims, 8 Drawing Figures

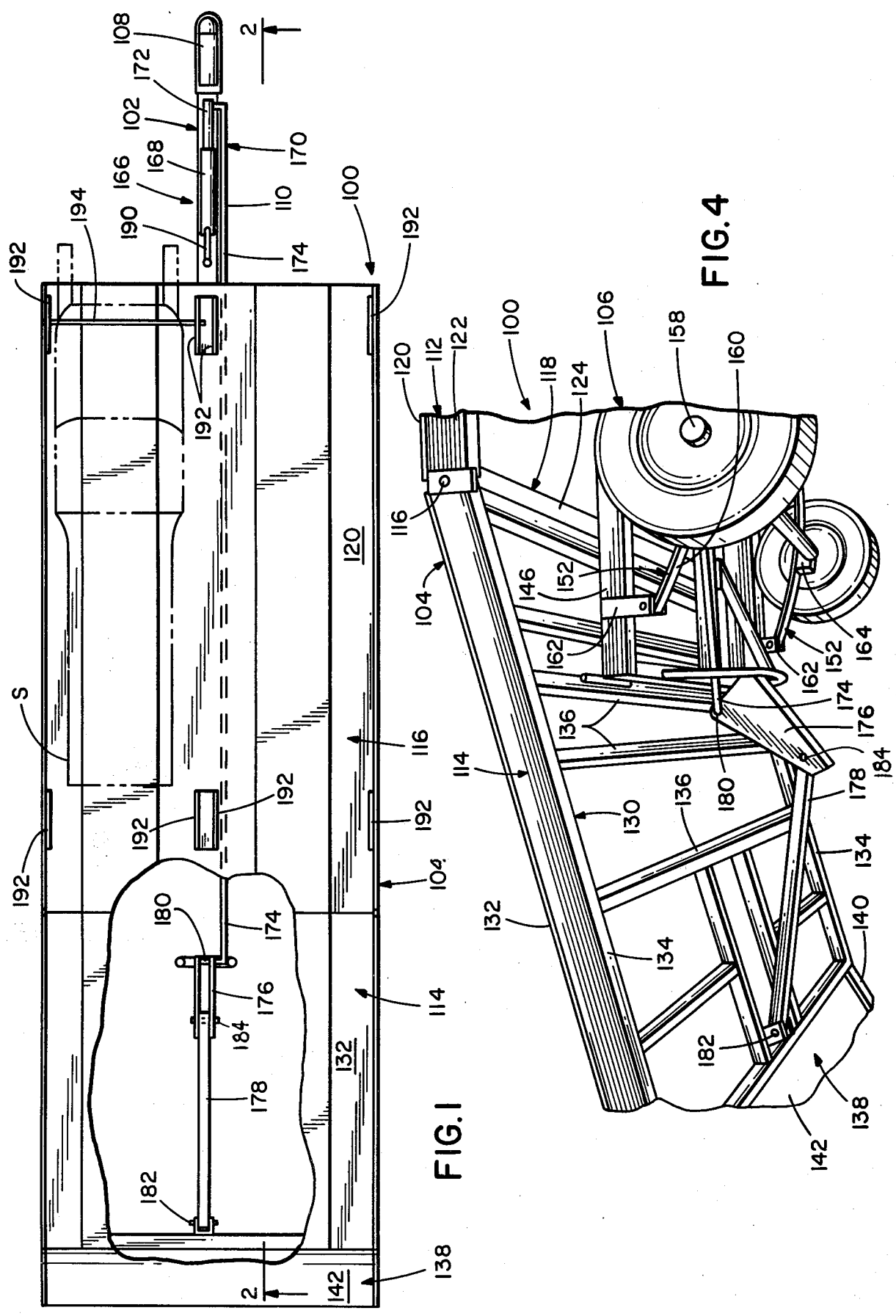

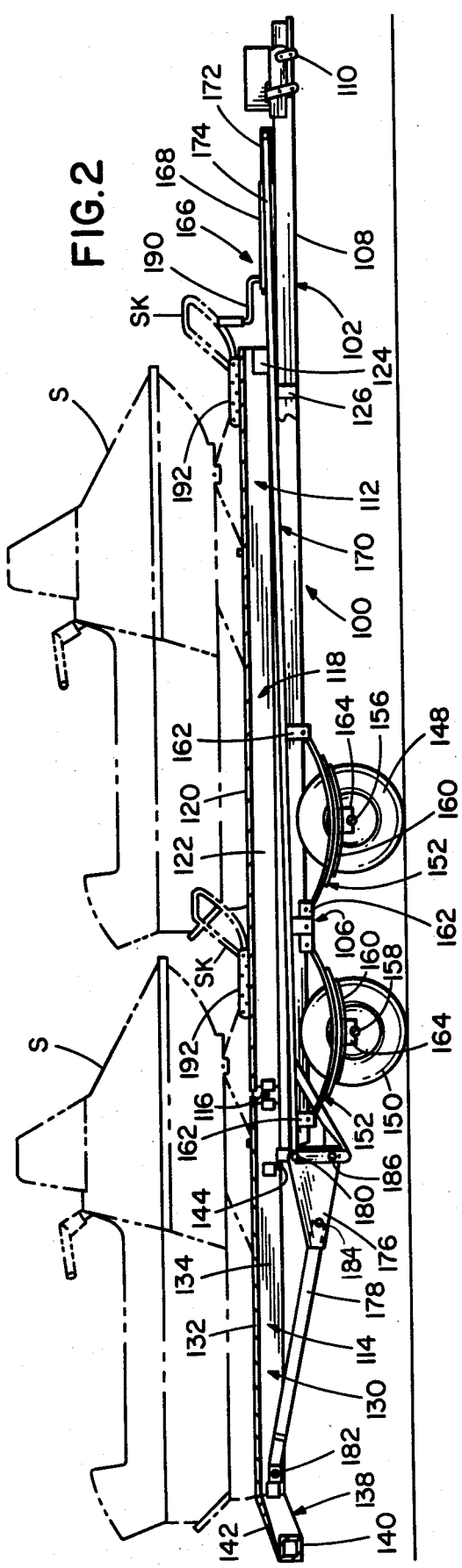
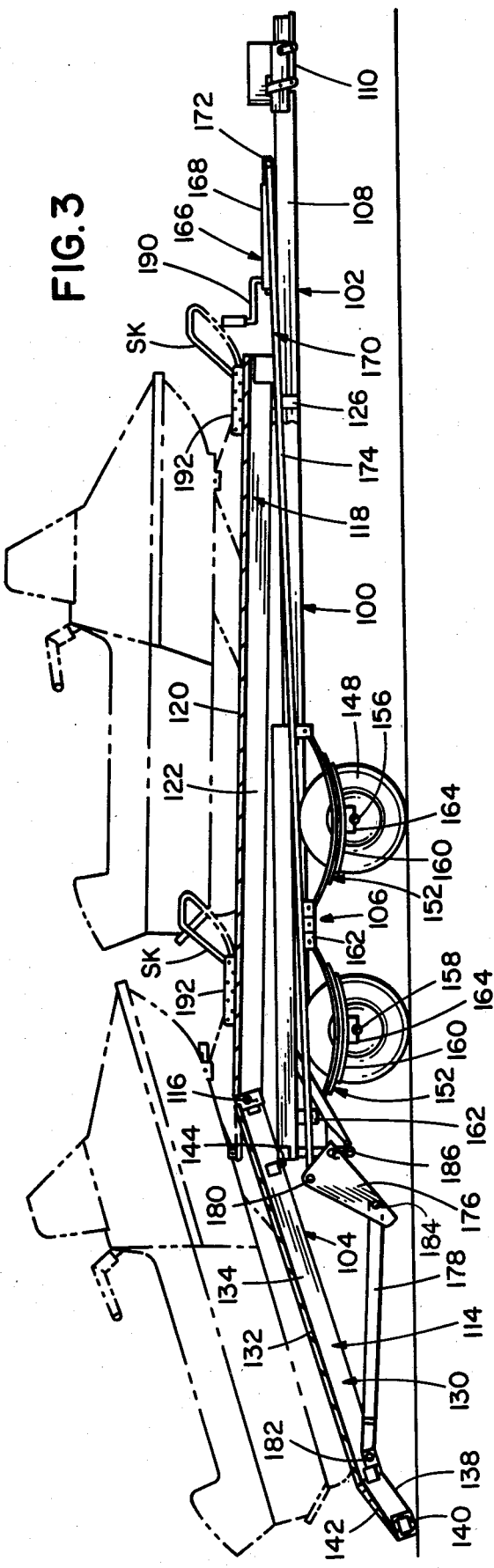

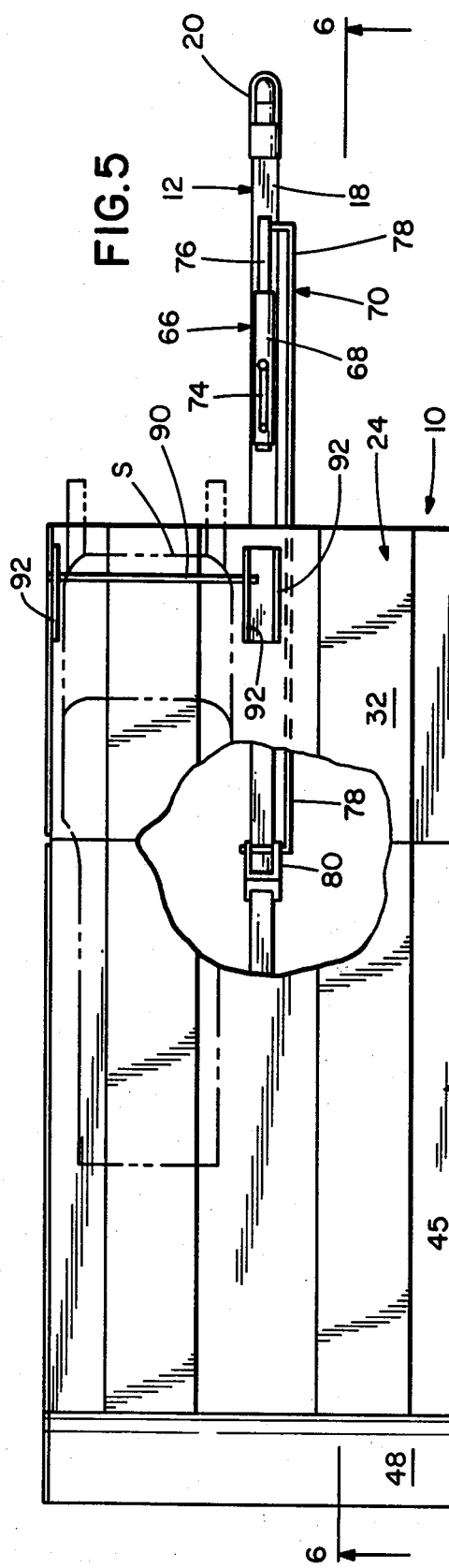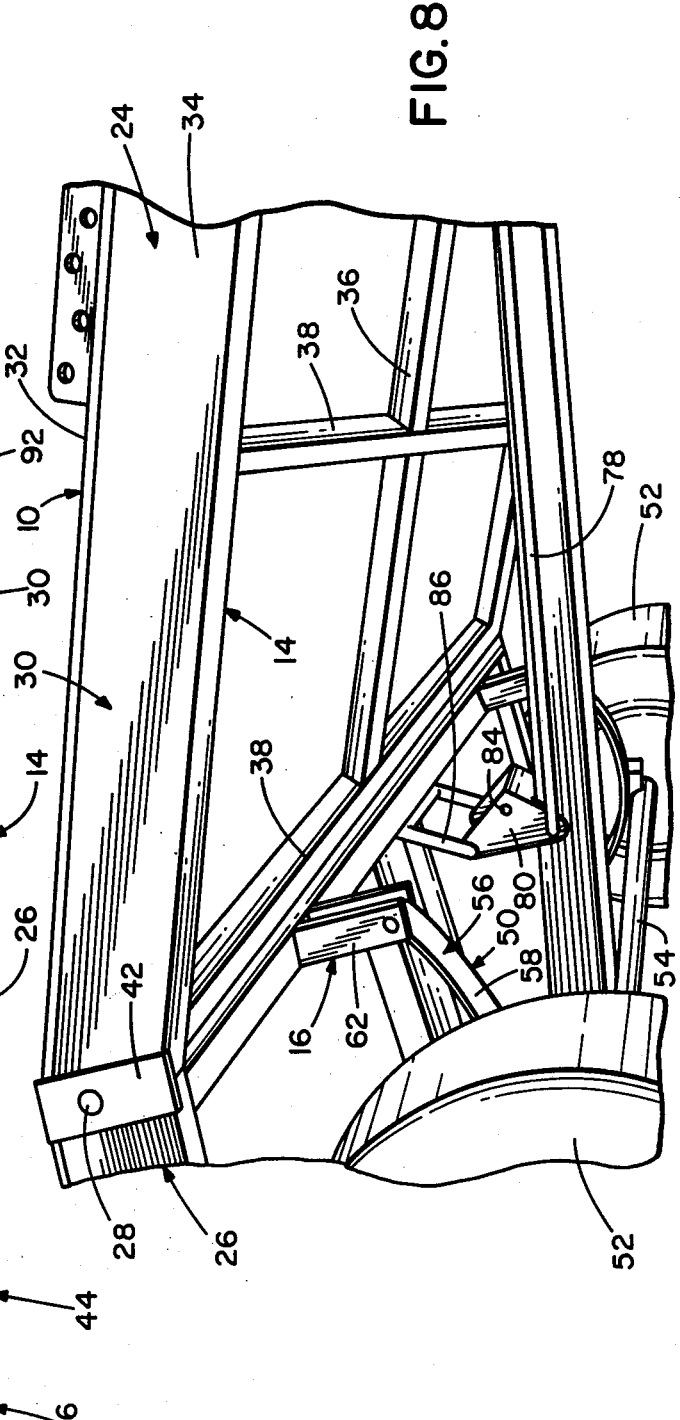

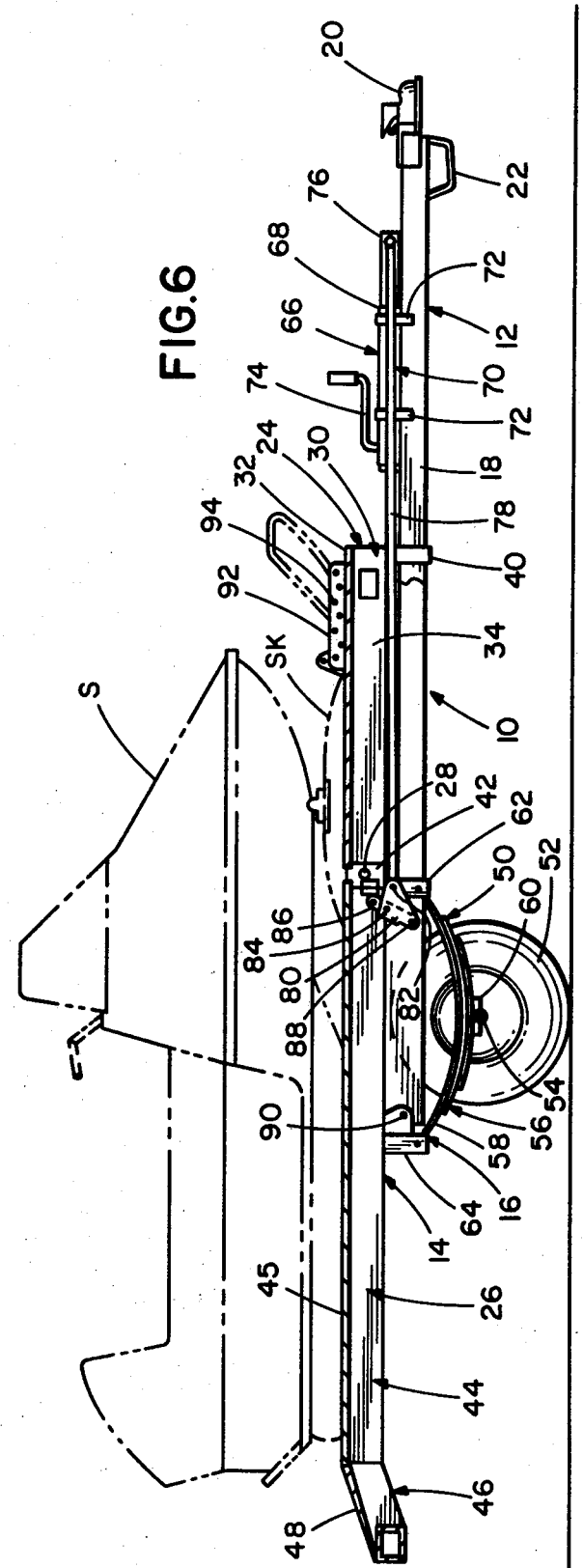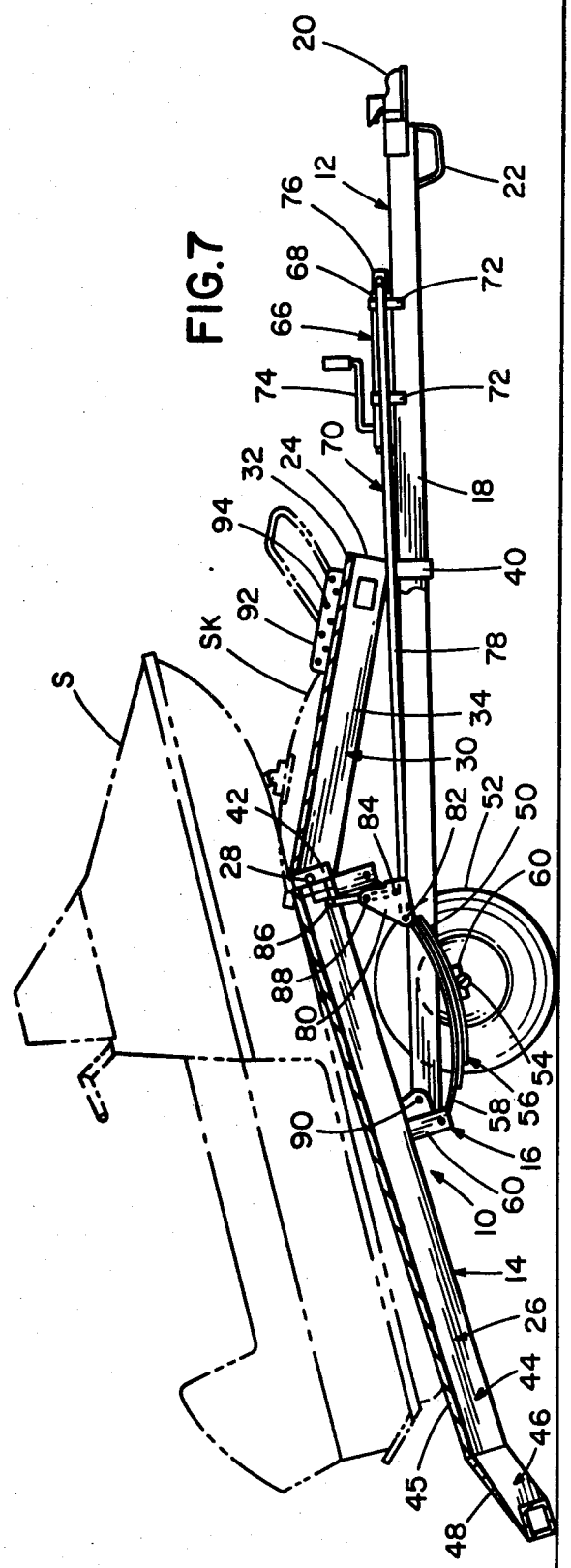

TRAILER ASSEMBLY FOR SNOWMOBILES

BACKGROUND OF THE INVENTION

Field of the Invention and Description of the Prior Art

This invention relates to a snowmobile trailer assembly of the type which is secured by a hitch mechanism to the rear of a truck or automobile and is constructed so as to generally support one, two, three or four snowmobiles thereon.

Trailers for hitching onto the rear of trucks, trailers, vans and the like have been used for many years for hauling a snowmobile or snowmobiles. Two place and four place snowmobile trailers are quite well known. Snowmobile trailers have generally been designed with a tilting bed arrangement wherein the bed is tilted from a level or horizontal position to an inclined position where the rear of the bed contacts the ground. This enables the snowmobile to be driven onto and moved from the trailer.

With the known tilting bed snowmobile trailers, problems are encountered when the snowmobile is driven onto the trailer assembly. In this regard, when the bed assembly is in the tilted position so as to enable the snowmobile to be driven thereon, the bed assembly, from the weight of the snowmobile and after the snowmobile is driven onto the trailer, drops to a substantially level position. However, when the bed drops to the level position when the machine is being driven, that is, under power, the snowmobile has a tendency to surge ahead. At times, the snowmobile will actually drop off the front of the trailer or possibly even hit the towing vehicle with the result that the snowmobile can injure the driver, persons in the vicinity, or cause damage to the trailer or vehicle towing the trailer.

On the other hand, if a person is careful in driving the snowmobile onto the trailer assembly, but has not driven far enough, the bed actually stays at a somewhat downwardly tilted position so that it is necessary to lock the brakes of the snowmobile or to block the snowmobile so that it will not slide off rearwardly while a second snowmobile is driven onto the trailer.

SUMMARY OF THE INVENTION

It is therefore an important object of this invention to provide an improved trailer assembly which substantially avoids the disadvantages of prior art snowmobile trailer assemblies.

It is also an important object of this invention to provide an improved snowmobile trailer assembly wherein the trailer assembly uses a bed assembly having a cooperating rear portion and front portion for positively securing the snowmobile in place on the snowmobile trailer assembly when being driven thereon.

A further object of the present invention is to provide a hinged bed snowmobile trailer assembly wherein the common construction of the snowmobile, with skis at the forward end and the track at the rearward end, cooperates with the trailer assembly to cause the snowmobile to be conveniently locked into position on the assembly while being driven into place in the trailer.

It is still another object of the present invention to provide an improved snowmobile trailer assembly utilizing a hinged bed assembly wherein the trailer assembly is characterized by its simplicity and economy of construction and manufacture and effectiveness in use.

Further purposes and objects of this invention will appear as the specification proceeds.

The foregoing objects are accomplished by providing a trailer assembly for transporting a snowmobile or similar equipment, the trailer comprising, in combination, a movable frame, a first snowmobile support portion mounted on the frame, a second snowmobile support portion mounted on the frame in cooperative relationship with the first support portion, and a mechanism for adjusting the relative angular position between the first and second support portions, the adjusting mechanism being constructed and arranged to move the support portions between a first position and a second position, the support portions being constructed and arranged to be at a selected angular position on the frame with the first support portion being inclined down towards the ground for facilitating loading and unloading of a snowmobile onto and from the trailer assembly when in the first position and to be at a substantial relative alignment for supporting a snowmobile in a substantially horizontal position when the snowmobile is being transported and when in the second position.

BRIEF DESCRIPTION OF THE DRAWINGS

Particular embodiments of the present invention are illustrated in the accompanying drawings wherein:

FIG. 1 is a top plan view of my improved snowmobile trailer assembly which is constructed to receive four snowmobiles thereon, one snowmobile being indicated in hidden line view;

FIG. 2 is a side elevational view of the embodiment of FIG. 1 illustrating the trailer assembly after the snowmobiles have been positioned thereon, the snowmobiles being shown in hidden line view;

FIG. 3 is a view similar to FIG. 2 illustrating the rear portion of the bed being in a downward tilted position for unloading and loading of a snowmobile thereon;

FIG. 4 is a pictorial view of the underside of a downwardly tilted rear bed portion shown in FIG. 3;

FIG. 5 is a top plan view of a second embodiment of the present invention illustrating a trailer which is constructed and arranged to receive two snowmobiles thereon;

FIG. 6 is a side elevational view of the embodiment of FIG. 5 illustrating the position of the trailer assembly when it is in the horizontal position with a snowmobile in place thereon;

FIG. 7 is a view similar to FIG. 6 illustrating the two place snowmobile trailer assembly of the embodiment of FIG. 5 when in the loading and unloading positions; and FIG. 8 is a pictorial view of the underside of the trailer assembly illustrated in FIG. 7 when in the loading and unloading position.

DETAILED DESCRIPTION OF THE PREFERRED EMBODIMENTS

Referring to FIGS. 5, 6, 7 and 8, there is shown one preferred embodiment of a snowmobile trailer assembly, generally 10, which is particularly constructed for transporting two snowmobiles, shown in hidden view in the drawings. Although the trailer assemblies, which are the subject of this invention are specifically designed for carrying one or more snowmobiles, it is to be understood that these trailers may be utilized, if desired, for trailing other things.

The trailer 10, generally includes a hitch portion, generally 12, a snowmobile support portion, generally 14, which is operatively mounted on the hitch portion 12, and a wheel assembly, generally 16, which is operatively mounted on the underside of the snowmobile support portion 14.

The hitch portion 12, as seen in FIGS. 5-8, generally comprises a longitudinally elongated rigid beam 18. The beam 18, in the operative position, is generally horizontal and extends longitudinally and substantially directly in line with the longitudinal axis of a vehicle (not shown) used for pulling the trailer 10. A ball hitch portion 20, located at the forward end of the beam 18, is lockably secured to a cooperating ball hitch portion (not shown) mounted on the pulling vehicle (not shown). The hitch assembly 20 is of conventional construction and need not be described herein in detail. A rigid handle 22 is mounted adjacent the ball hitch 20 on the beam 18 to provide convenience for a person to manually move the trailer 10.

The snowmobile support portion 14 includes a forward support section 24 and a rearward support section 26, the forward and rearward sections 24 and 26 being pivotally secured together along a transverse, horizontal pivot axis 28.

Referring to FIG. 6, the forward section 24 of the snowmobile support portion 14 includes a lower support frame, generally 30, and an upper, planar, rigid support plate 32 which is mounted on the frame 30 by suitable fastening. The frame 30 includes a pair of longitudinal rigid side supports 34 and an intermediate rigid support 36. The longitudinal supports 34 and 36 are rigidly interconnected by rigid cross supports 38.

The forward end of the forward section 24 is hingedly secured, by a suitable hinge member (not shown), to a slidable support member 40 which is slidably carried on the beam 18 of the hitch portion 12. The rear end of the rearward support section 26 is operatively secured to a hinge member 42 which pivotally secures the forward section 24 to the rearward section 26 about the pivot axis 28.

The rearward section 26 of the support portion 14, as seen in FIGS. 6, 7 and 8, include a rigid support frame, generally 44, and a rigid upper support plate 45 which is fixedly secured on the upper surface of the support frame 44 and which is contiguous with the upper surface of the plate 32 of the front section 24. The rearward support section 26 includes a downwardly angled, rigid back portion 46 which is rigidly secured to the main part of the rearward portion 26. The angled back portion 46, as seen best in FIG. 7, facilitates loading and unloading of a snowmobile S to and from the trailer assembly 10 when it is in the downwardly tilted position when resting on the ground. The angled back section 46 includes a rigid upper plate 48 which is contiguous with the upper surface of the plate 45.

A suspension assembly 50 interconnects the wheel assembly 16 with the support portion 14. Referring particularly to FIGS. 6 and 7, a pair of laterally spaced wheels 52 are interconnected by a transverse axle 54. A pair of laterally spaced leaf-spring assemblies 56 springedly support the snowmobile support portion 14 on the wheel assembly 16. Each leaf-spring suspension 56 includes a leaf-spring 58, of conventional construction, having a central portion secured to a support member 60 which is movably mounted on the axle 54. The outer ends of each leaf-spring 58 are secured to longitudinally spaced front and rear supports 62 and 64 which are rigidly secured to the support frame 44 of the rearward section 26 of the snowmobile support portion 14.

The leaf-spring suspensions 46 are mounted in spaced relationship to each other, as seen best in FIG. 8, adjacent the inner sides of the wheels 52.

An operating mechanism, generally 66, is mounted on the hitch portion 12 and is operatively connected to the pivotal support portion 14 in order to pivot the forward section 24 relative to the rearward section 26 of the snowmobile support portion 14, between the position of FIG. 6, when the snowmobile S is being stored or transported, and the position of FIG. 7, when the snowmobile S is being loaded or unloaded from the trailer assembly 10.

The mechanism 66 generally includes a jack portion 68 and a linkage portion, generally 70, which is operatively interconnected to the rearward section 26 of the snowmobile support portion 14 of the trailer assembly 10. The jack 68 is horizontally mounted on the longitudinal beam 18 of the hitch portion 12 and is secured thereto by a pair of carrying straps 72. The jack 68 is generally of conventional construction and includes a crank or handle portion 74 for operating the jack 68. The jack 68 is shown in its fully retracted position in FIG. 6, when the snowmobile is being transported or stored and when the upper surfaces of the forward support section 24 and the rearward support section 26 are substantially contiguous with each other. The jack 68 includes a movable extensible, rigid section 76. In a conventional manner, the extensible section 76 may be extended between the portion of FIG. 6 and the retracted position of FIG. 7, by operation of the crank 74.

The linkage portion 70 includes a longitudinally elongated link 78 which is operatively connected at its forward end to the forward end of the extensible section 76 of the jack 68. The opposite or rearward end of the elongated link 78 is pivotally and operatively interconnected to an intermediate crank or link 80 at a pivot connection 82. The intermediate link 80 has a fixed pivot point 84 located on the beam 18 of the hitch portion 12. The intermediate link or crank 80 is also pivotally interconnected to a link 86 at a pivot connection 88. The opposite end of the link 86 is pivotally interconnected to the forward end of the support frame 44 of the rearward section 26 of the snowmobile support portion 14.

In order to operate the trailer assembly 10 embodied in FIGS. 5-8, when it is desired to load a snowmobile S onto the trailer assembly 10, the operator operates the crank handle 74 so as to retract the extensible section 76 of the jack 68 from the position of FIG. 6 to the retracted position of FIG. 7. When this occurs, the elongated link 78 has its rearward end driven rearwardly to cause the intermediate link or crank 80 to pivot about the fixed pivot 84 and thereby cause the links 86 to move upwardly and raise the front end of the rearward snowmobile support section 26 and the rearward portion of the forward section 24 upwardly to cause pivoting about the interconnecting pivot axis 28 of the support sections 24 and 26. Then, the forward end of the forward section 24 slides rearwardly because of the pivotal connection to the slidable support 40 so the forward section 24 is tilted upwardly and rearwardly. At the same time, the rearward section 26 pivots upwardly and downwardly about a pivot connection 90 to the rear end of hitch portion 12. When the back edge of the angled back section 46 engages the ground, the trailer assembly 10 is in position to load (or unload) a snowmobile S thereon. As seen in FIG. 7, it is important for the three pivot points 88, 84 and 82 to be in direct alignment so as to substantially avoid any undue stress and strain on the jack 68 and the linkage 70.

When the snowmobile S is driven onto the rearward section 26 of the support portion 14 it is seen that the skis SK, at the front of the snowmobile and shown in imaginary view, in FIG. 7, are spring loaded and move into substantial alignment with the upper surface of the tilted forward support section 24, thereby, in effect, locking the snowmobile S in position at the front of the trailer assembly 10. In this way, there is substantial assurance that the snowmobile S is not inadvertently driven off the front of the snowmobile to cause possible damage to the snowmobile, to the trailer, to the operator, and persons in the vicinity.

After the snowmobile is on the trailer, the assembly is moved from the position in FIG. 7 to that of FIG. 6 by operation of the crank 74 by extending the extensible section 76. When this occurs, the link 78 moves forwardly thereby causing the intermediate link or crank 80 to pivot about the fixed pivot axis 84 and cause the sections 24 and 26 to pivot downwardly until they are in a substantially flat position.

Preferably, two sets of laterally spaced upright plates 92 are located in a longitudinal position at the forward portion of the forward section 24 of the snowmobile support portion 14. The plates 92 include transverse openings 94 which are constructed and arranged to receive an elongated, transverse rigid rod 90. The rod 90 engages the top of the skis SK and thereby, acts to secure the snowmobile S on the trailer assembly 10.

Referring to the embodiment of FIGS. 1-4, there is shown an alternate embodiment of the present inventive snowmobile trailer assembly 100, which is particularly constructed and arranged to receive four snowmobiles thereon, with two pairs in side-by-side relationship.

The trailer assembly 100, embodied in FIGS. 1-4, is of similar construction to the two place snowmobile trailer 10 embodied in FIGS. 5-8. The trailer 100 includes a hitch portion, generally 102, a snowmobile support portion, generally 104, which is operatively secured to the hitch portion 102, and a wheel assembly portion, generally 106, which is operatively mounted on the underside of the snowmobile support portion 104.

Referring to FIGS. 1-3, the hitch portion 102 generally includes a longitudinally elongated rigid beam 108 which, in the operative or trailing position, is generally horizontal and is aligned with the longitudinal axis of a vehicle (not shown) to which the trailer 100 is attached. A ball hitch portion 110, of conventional construction, is mounted at the forward end of the beam 108 of the hitch portion 102 and is constructed and arranged to be lockably secured to a ball portion of a hitch (not shown) which is mounted on the pulling vehicle (not shown).

The snowmobile support portion generally includes a forward support section 112 and a rearward support section 114. The forward section 112 and a rearward section 114 are pivotally secured together along a transverse pivot axis 116.

The forward section 112 of the snowmobile support portion 104 includes a rigid lower support frame, generally 118, and a planar, rigid metallic support plate 120, which is rigidly secured to the upper surface of the support frame 118. The frame 118 is defined by rigid longitudinal members 122 and interconnected rigid cross frame members 124, as seen in FIGS. 2-4. The forward end of the forward support section 112 is hingedly secured by a suitable hinge member (not shown) to a slidable support 126 which is slidably carried on the longitudinal beam 108 of the hitch portion 102. The rear end of the front support section 112 is pivotally secured to the front end of the rearward section 114 along the transverse pivot axis 116, as indicated previously.

The rearward support section 114, of the snowmobile support portion 104, as seen best in FIG. 4, includes a rigid lower support frame, generally 130, and a rigid planar upper support plate 132 which is fixedly mounted on the upper surface 130 by suitable means. The frame 130 includes rigid longitudinal side members 134 and rigid cross members 136, which are rigidly interconnected to the side members 134. A downwardly angled back portion 138 is rigidly secured to the rear edge of the rearward support section 114. The downwardly angled back portion 138 facilitates loading of a snowmobile S on the trailer assembly 100 when the assembly 100 is in the loading or unloading position, as seen in FIG. 7. The angled back portion 138 includes a lower frame 140 with a rigid upper plate 142 mounted thereon which is contiguous with the upper surface of the support plate 132 of the rear snowmobile support section 114. As seen best in FIGS. 2 and 3, the rear support section 114 is pivotally secured to the rear, upper portion of the wheel assembly 106 along a pivot axis 144.

The wheel assembly 106 generally includes a frame, generally 146, a spaced pair of front wheels 148, a pair of spaced rear wheels 150 and suspension sections 152 for supporting each of the wheels 148 and 150. The front wheels 148 are interconnected by a transverse axle 156 and the rear wheels 150 are interconnected by an axle 158, spaced to the rear of the front axle 156.

Each of the four suspension sections 152 includes a leaf spring 160, of conventional construction. Support members 162 are rigidly secured to and project downwardly from the side beams 154 of the wheel assembly frame 146. Each of the opposite ends of each leaf spring 160 is secured to one of the supports 162. The central lower portion of each leaf spring 160 is secured to a support block 164 which is operatively secured to each of the axles 156 and 158, adjacent the inner surface of each of the wheels 148 and 150. In this way, the suspension 152 provides for springable support for the support portion 104 of the trailer assembly 100, relative to the wheels 148 and 150.

An operating mechanism 166 is operatively mounted on the hitch portion 102 and is connected to the support portion 104 in order to pivotally move the forward support section 112 and the rearward support section 114 relative to each other so as to pivot the rearward section 114 downwardly, from the position shown in FIG. 3, to the horizontal position shown in FIG. 2. The moving mechanism 166 includes a jack 168 which is rigidly secured, in a horizontal position, near the forward end of the beam 108 of the hitch assembly 102 and an operating linkage, generally 170.

The jack 168 is generally constructed in the same manner as the jack 68 of the trailer embodiment 10 of FIGS. 5-8 and is also of conventional construction. The jack 168 is rigidly secured adjacent to the beam 108 and includes an extensible rigid portion 172 which is movable inwardly and outwardly longitudinally of the beam 108. The outer end of the extensible section 172 is pivotally interconnected to an elongated rigid link 174 which has its opposite end pivotally interconnected to a link or crank member 176 at an axis 180. The linkage 170, in addition to the elongated link 174 and crank 176, also includes a link 178, which is pivotally secured to the rear portion of the rear support section 114 of the snowmobile support portion 104 along a pivot axis 182 and to the rear end of the crank 176 along a pivot axis 184. The crank 176 is pivotally secured along a pivot axis 186 to the rear portion of the frame 146.

Although the operation of the trailer assembly 100 is similar to the embodiment 10 of FIGS. 5-8, a brief description of the operation thereof will be provided. When a person wishes to load snowmobiles onto the trailer assembly 100, the handle 190 of the jack 168 is operated in order to retract the extensible member 172 of the jack 168 from the extended position of the FIG. 2 to the retracted position of FIG. 3. When this occurs, the elongated link 174 is moved rearwardly to thereby pivot the crank 176 about the pivot axis 186 and the outer end of the crank art 196 pivots downwardly. This causes the link 178 to move downwardly and thereby cause the rear snowmobile support section 114 to pivot downwardly about the pivot axis 128 until the downwardly angled back portion 138 engages the ground. At this time, one to four snowmobiles may be driven onto the trailer assembly 100, with two pairs of snowmobiles being mounted in side-by-side relationship. As the snowmobile is driven onto the rearward section, the skis SK, which are springably mounted on the snowmobile S, pivot downwardly as they pass onto the front support section 112, thereby securing the snowmobile S thereon. The snowmobile S may then be carefully driven forwardly until the front end of the skis SK reach the position shown in FIG. 3.

As in the trailer embodiment 10, spaced upright rigid apertured plates 192 are located near the front end of the forward snowmobile support section 112, approximately at the position where the skis SK on the front of the snowmobile S are located. A rod 194 may then be passed through the aperture in the plate 192 and against the skis to hold the snowmobile in place. Similarly, after the first snowmobile S has been positioned, as seen in FIG. 3, a second snowmobile S is moved into place as seen in FIG. 3. Finally, two more snowmobiles may be driven into place and may be secured in place by appropriately positioned upright plates 192 and securing rod 194. At this time, the operator may then operate the jack 168 and cause the extensible section 172 to extend outwardly to the position of FIG. 2 thereby causing reverse movement of the crank 176 and raising the rear support section 114 upwardly until the support plate of the rear section 114 is in alignment with the support plate of the front section 112. At this time, it is important to note that the three pivots 180, 182 and 184 are in direct alignment with each other so that the crank 176 and link 178 act as a beam, to thereby substantially prevent undue forces to act on the jack 168.

While in the foregoing there has been provided a detailed description of particular embodiments of the present invention, it is to be understood that all equivalents obvious to those having skill in the art are to be included within the scope of the invention, as claimed.

What is claim and desire to secure by Letters Patent is:

1. A trailer assembly comprising, in combination, a movable frame, a first support portion mounted on said frame, a second support portion mounted on said frame, in cooperative relationship with said first support portion, and means for adjusting the relative angular position between said first and second support portions, said adjusting means being constructed and arranged for moving said support portions between a first position and a second position, said adjusting means comprising a movable operative member operatively affixed to said frame and a linkage operatively interconnected between said movable member and said first and second support portions for hingedly moving said support portions between said first and second positions, said support portions being constructed and arranged to be at a relative angular position on said frame with said first support portion being inclined downwardly toward the ground for facilitating loading and unloading of objects to be supported thereon, when insaid first position, and to be in supporting alignment, for said objects, with both said support portions being in a substantially level position.

2. The trailer assembly of claim 1 including a hitch portion which is secured to said frame and is constructed and arranged to be secured to said frame for towing purposes, and said frame further includes a wheel assembly operatively mounted on said frame.

3. The assembly of claim 1 wherein said support portions are hingedly secured together, and, in said first portion, are at a relatively angular position to each other and, in said second position, are level and substantially contiguous with each other.

4. The assembly of claim 1 wherein said trailer assembly is constructed and arranged for transporting snowmobiles, said snowmobiles being constructed and arranged to be supported on said first and second snowmobile support portions when in said second position, while being transported on said frame, and when in said first position, being inclined downwardly toward the ground for facilitating loading and unloading of snowmobiles onto and from said trailer assembly.

5. The trailer assembly of claim 1 wherein said adjusting means comprises a linkage operatively interconnected to said first and second support portions, and a drive member which is operatively mounted on said frame, said drive member and said linkage being operatively interconnected for movement of said first and second support portions between said first and second positions.

6. The trailer assembly of claim 1 wherein said trailer assembly is constructed and arranged particularly for transporting a snowmobile and said assembly includes means for securing each snowmobile in place on said assembly.

7. A trailer assembly comprising, in combination, a movable frame, a hitch member secured to said frame, a wheel assembly secured to said frame, a first support portion mounted on said frame, a second support portion mounted on said frame in cooperative relationship with said first support portion, and means for adjusting the relative angular position between said first and second support portions, said adjusting means being constructed and arranged for moving said support portions between said first position and a second position, said adjusting means including a jack member operatively affixed to said hitch member and a linkage operatively interconnected between said jack member and said first and second support portions for hingedly moving said support portions between said first and second positions, said support portions being constructed and arranged to be at a relative angular position on said frame with said first support portion being inclined downwardly toward the ground for facilitating loading and unloading of objects to be supported thereon when in said first position, and to be in supporting alignment for said objects, with both said support portions being in a substantially level position.

* * * * *